United States Patent Office 3,636,037
Patented Jan. 18, 1972

3,636,037
CARBONIC ESTERS OF 4-NITROPHENOL
Cyril Donninger and John A. Schofield, Kent, England, assignors to Shell Oil Company, New York, N.Y.
No Drawing. Filed June 2, 1969, Ser. No. 829,786
Claims priority, application Great Britain, June 4, 1968, 26,573/68; Jan. 24, 1969, 4,080/69
Int. Cl. A01n 9/20; C07c 79/32, 79/34
U.S. Cl. 260—463                                  8 Claims

ABSTRACT OF THE DISCLOSURE

Herbicidally active carbonic esters of 2-substituted-4-nitro-6-halophenols and methods for their preparation.

SUMMARY OF THE INVENTION

Accordingly the present invention relates to novel 4-nitrophenol derivatives of the formula:

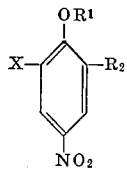

I wherein $R_1$ represents a $C_1$ to $C_6$ radical selected from the group consisting of an alkoxycarbonyl, particularly methoxycarbonyl, alkenyloxycarbonyl, particularly allyloxycarbonyl, alkynyloxycarbonyl, particularly propargyloxycarbonyl, alkylcarbamoyl, particularly N-methyl carbamoyl, and alkoxycarbonylalkyl, particularly ethoxycarbonylmethyl; $R_2$ represents an alkyl group of 1 to 6 carbon atoms or a cycloalkyl group of 3 to 6 carbon atoms, especially methyl, propyl, butyl or cyclohexyl; and X represents a chlorine, bromine or iodine atom.

Preferred novel compounds are those wherein $R_1$ represents a $C_1$ to $C_6$ group selected from the group consisting of alkoxycarbonyl, particularly methoxycarbonyl, alkylcarbamoyl, particularly N-methylcarbamoyl, and alkoxycarbonylalkyl, particularly ethoxycarbonylmethyl; $R_2$ represents an alkyl group of 1 to 6 carbon atoms or a cycloalkyl group of 3 to 6 carbon atoms, especially methyl, propyl, butyl or cyclohexyl; and X represents a chlorine, bromine or iodine atom.

The novel compounds of the present invention may be prepared by the reaction of a substituted phenol of Formula II:

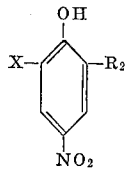

II wherein $R_2$ and X are as defined above, with an organic halide of the formula $R_1Hal$ in which $R_1$ is as defined above and Hal represents a halogen, preferably chlorine, atom. The reaction is suitably carried out in the presence of a base such as an alkali metal hydroxide or alkoxide or a tertiary amine. Alternatively, those compounds of Formula I wherein $R_1$ represents an alkylcarbamoyl group may be more conveniently prepared by reacting the corresponding phenol of Formula II with an alkyl isocyanate, for example methyl isocyanate, in the presence of a base, such as a tertiary amine.

The phenols of Formula II can be prepared by a number of conventional routes, but a route that has been found to be generally convenient comprises acylating a 2-substituted phenol of Formula III:

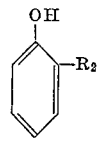

III with an alkyl chloroformate, nitrating the resulting ester, with concentrated nitric acid, saponifying the 4-nitro ester, with a base such as aqueous sodium hydroxide, to yield the 4-nitrophenol and finally halogenating this compound to yield the 2-substituted-4-nitro-6-halophenol of Formula II.

An alternative route for preparing those phenols of Formula II wherein X represents a bromine atom comprises nitrating a 4,6-dibromo-derivative of formula:

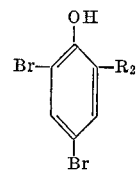

IV suitably with fuming nitric acid, to replace selectively the bromine atom at the 4-position by a nitro group.

As indicated above, the compounds of the invention are of interest as herbicides.

For this purpose, the compounds of this invention may be formulated to include, in addition to one or more 4-nitrophenol derivatives of the invention, a carrier or a surface-active agent or both a carrier and a surface-active agent.

The compounds of the invention, processes for their preparation and their herbicidal activity are illustrated in the following examples, in which parts by weight (w.) and parts by volume (v.) bear the same relation as the kilogram to the liter and all temperatures are in degrees centigrade.

EXAMPLE I 6-bromo-4-nitro-2-isopropylphenyl methyl carbonate

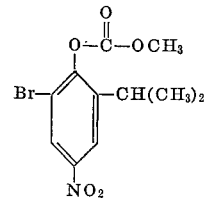

(a) PREPARATION OF 6-BROMO-4-NITRO-2-ISOPROPYLPHENOL

Procedure 1: 2-isopropylphenol (27.2 w.) was dissolved in water (50 v.) containing sodium hydroxide (8 w.). Acetone (50 v.) was added to the solution and the mixture stirred and cooled to 0°. Methyl chloroformate (17 v.) was added dropwise to the mixture at such a rate as to keep the temperature below 10°. The mixture was then extracted with benzene (2× 200 v.) and the extracts washed with 2% sodium hydroxide solution (100 v.) and water (100 v.). After drying over anhydrous sodium sulfate, the benzene was evaporated from the solution to leave a residue which on distillation gave 2-isopropylphenyl methyl carbonate, B.P. 65–66°/0.1 mm.

The isopropylphenyl methyl carbonate (11.6 w.) was added dropwise with stirring to 95% w./w. concentrated nitric acid (S.G. 1.5; 20 w.) cooled to 0°. The rate of addition was such to maintain the temperature of the mixture around 0°. The mixture was stirred for a further 30 minutes and then poured into a mixture of ice and saturated sodium bicarbonate solution (200 v.). The mixture was extracted with ether (400 v.) and the ether extract washed with saturated sodium bicarbonate solution until there was no further effervescence. The ether solution was dried over anhydrous sodium sulfate and then evaporated to give 4-nitro-2-isopropylphenyl methyl carbonate.

4-nitro-2-isopropylphenyl methyl carbonate (6.8 w.) was added to a warm solution of sodium hydroxide (6.8 w.) in water (100 v.). Sufficient acetone to render the mixture homogeneous was added and the solution was stirred for 2 hours at room temperature. Water (100 v.) was added and the resulting solution acidified with concentrated hydrochloric acid and extracted with ether (2× 100 v.). The ether extracts were dried over anhydrous sodium sulfate and evaporated to give 4-nitro-2-isopropylphenol.

4 - nitro - 2 - isopropylphenol (4 w.) was dissolved in glacial acetic acid (60 v.) and anhydrous sodium acetate (1.8 w.) added to the solution. The mixture was cooled in ice and a solution of bromine (3.5 w.) in glacial acetic acid (20 v.) was added dropwise with stirring over a period of 30 minutes. The mixture was stirred for a further 1 hour at room temperature and then poured into ice-water (200 v.). The mixture was extracted with ether (2× 200 v.) and the extracts dried over anhydrous sodium sulfate and evaporated. The residue was purified by chromatography on silica gel using chloroform as eluant, followed by recrystallization from light petroleum (B.P. 60–80°) to give 6-bromo-4-nitro-2-isopropylphenol having A.M.P. of 87.5–89°.

Analysis.—Calculated for $C_9H_{10}NO_3$ (percent): C, 41.5; H, 3.9; N, 5.4. Found (percent): C, 41.5; H, 4.1; N, 5.7.

Procedure 2: Fuming nitric acid (S.G. 1.5; 0.45 v.) was added dropwise to a stirred ice-cooled solution of 4,6-dibromo-2-isopropylphenol (2.95 w.) in glacial acetic acid (50 v.). The solution was stirred for a further 15 minutes and poured into ice-water (150 v.). The mixture was allowed to stand for 1 hour and the precipitated material obtained was separated by decantation. The precipitate was dissolved in dichloromethane and the solution dried over anhydrous sodium sulfate and evaporated. The crude product was purified in the same manner as described in Procedure 1, to give 6-bromo-4-nitro-2-isopropylphenol having A.M.P. of 89°.

(b) PREPARATION OF 6-BROMO-4-NITRO-2-ISOPROPYL-PHENYL METHYL CARBONATE

Methyl chloroformate (0.33 v.) was added to a solution of 6-bromo-4-nitro-2-isopropylphenol (1.0 w.) in ether (100 v.) containing triethylamine (0.55 v.). The mixture was stirred at room temperature for 2 hours, washed with water (100 v.), saturated aqueous sodium carbonate (2× 100 v.) and water (100 v.). The solution was dried over anhydrous sodium sulfate, evaporated and the residue recrystallized from light petroleum (B.P. 60–80°) to give the desired product having A.M.P. of 94–95°.

Analysis.—Calculated for $C_{11}H_{12}NO_5Br$ (percent): C, 41.5; H, 3.8; N, 4.4. Found (percent): C, 41.5; H, 3.9; N, 4.2.

EXAMPLE II 6-chloro-4-nitro-2-isopropylphenyl methyl carbonate

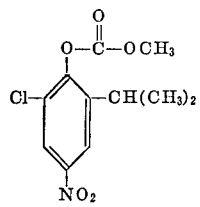

(a) PREPARATION OF 6-CHLORO-4-NITRO-2-ISOPROPYLPHENOL 4-nitro-2-isopropylphenol (9.05 w., prepared as in Example I) was dissolved in glacial acetic acid (80 v.), N,N'-dichlorourea (3.25 w.) was added followed by 50% sulfuric acid (15 v.) and the solution was then stirred for 1 hour at room temperature. A further portion of N,N'-dichlorourea (1.6 w.) was added and the mixture stirred for a further 1 hour. The mixture was then poured into ice-water (600 v.) and the precipitated material formed was separated and dissolved in dichloromethane (200 v.). The solution was dried over anhydrous sodium sulfate and evaporated. The residue was purified by chromatography on silica gel using chloroform as eluant, followed by recrystalization from light petroleum (B.P. 60–80°) to give 6-chloro-4-nitro-2-isopropylphenol having A.M.P. of 89–90°.

Analysis.—Calculated for $C_9H_{10}NO_3Cl$ (percent): C, 50.1; H, 4.6; Cl, 16.5%. Found (percent): C, 50.5; H, 4.6; Cl, 16.5.

(b) PREPARATION OF 6-CHLORO-4-NITRO-2-ISOPROPYL-PHENYL METHYL CARBONATE

Methyl chlorofomate (1.1 v.) was added to a solution of 6 - chloro-4-nitro-2-isopropylphenol (2.8 w.) in ether (200 v.) containing triethylamine (1.8 v.). The mixture was stirred for 2 hours at room temperature, washed with water (2× 100 v.), saturated sodium carbonate solution (2× 100 v.), water (100 v.) and dried over sodium sulfate. The solution was evaporated and the residue recrystallized from light petroleum to give the desired product having a M.P. 90–91°.

Analysis.—Calculated for $C_{11}H_{12}NO_5Cl$ (percent): C, 48.3; H, 4.4; N, 5.1. Found (percent): C, 48.3; H, 4.7; N, 4.8.

EXAMPLE III 6-iodo-4-nitro-2-isopropylphenyl methyl carbonate

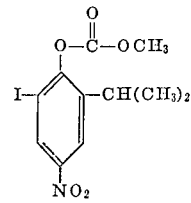

(a) PREPARATION OF 6-IODO-4-NITRO-2-ISOPROPYLPHENOL

Finely powdered sodium iodide (33 w.) was added in portions to a solution of dichloramine-T (26.3 w.) in glacial acetic acid (250 v.). When all the sodium iodide had dissolved, the solution was added dropwise to a stirred solution of 4-nitro-2-isopropylphenyl (40 w., prepared as in Example I) in glacial acetic acid (250 v.). The solution was then stirred for a further 15 minutes, poured into ice-water (1500 v.) and the mixture allowed to stand overnight at 6°. The crude solid formed was filtered off, dissolved in ether (250 v.), washed with saturated sodium bisulfite solution, water and then dried over sodium sulfate.

The dried solution was evaporated and the residue dissolved in a solution of sodium hydroxide (11.2 w.) in the minimum quantity of water required for complete solution. A slight excess of sodium chloride was then added, the mixture cooled for 30 minutes and the precipitated solid removed by filtration. The solid was suspended in water (30 v.), the mixture acidified and then cooled. The product was filtered off, washed with water, air dried and recrystallized from light petroleum (B.P. 60–80°) to give 6-iodo-4-nitro-2-isopropylphenol having a M.P. of 91–92°.

Analysis.—Calculated for $C_9H_{10}NO_3I$ (percent): C, 35.2; H, 3.3; N, 4.6. Found (percent): C, 35.2; H, 3.6; N, 4.5.

(b) PREPARATION OF 6-IODO-4-NITRO-2-ISOPROPYL-PHENYL METHYL CARBONATE

Methyl chloroformate (15.6 w.) was added dropwise to a stirred solution of 6-iodo-4-nitro-2-isopropyl phenol (45 w.) in ether (1000 v.) containing triethylamine (16.6 w.). A further quantity of ether (250 v.) was added and the mixture stirred for a further 3 hours at room temperature. The mixture was then washed with water (2× 1000 v.), aqueous sodium carbonate solution (until the aqueous extract was colorless), water and dried over sodium sulfate. The dried solution was evaporated to give the crude product which was recrystallized from light petroleum (B.P. 60–80°) to give the desired product having a M.P. 86–88°.

*Analysis.*—Calculated for $C_{11}H_{12}NO_5I$ (percent): C, 36.2; H, 3.3; N, 3.8. Found (percent): C, 36.0; H, 3.4; N, 3.7.

EXAMPLE IV 6-bromo-4-nitro-6-isopropylphenyl N-methyl carbamate

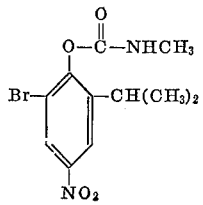

6-bromo-4-nitro-2-isopropylphenol (2.6 w., prepared as in Example I) was dissolved in dichloromethane (50 v.) and methyl isocyanate (0.6 w.) added followed by triethylamine (2 drops). The mixture was allowed to stand overnight at room temperature and then evaporated to dryness. The residue was triturated with ether and recrystallized from benzene to give the desired product having a M.P. of 180–181°.

*Analysis.*—Calculated for $C_{11}H_{13}N_2O_4Br$ (percent): C, 41.6; H, 4.1; N, 8.8. Found (percent): C, 41.6; H, 4.1; N, 9.2.

EXAMPLE V 6-bromo-4-nitro-6-isopropylphenyl propargyl carbonate

A solution of propargyl chloroformate (2.1 w.) in ether (20 v.) was added dropwise with stirring to a solution of 6-bromo-4-nitro-2-isopropyl phenol (4.0 w., prepared as in Example I) in ether containing triethylamine (2.1 v.). The mixture was stirred for 3 hours at room temperature, washed with water (100 v.) and dried over sodium sulfate. The solution was evaporated and the residue recrystallized from light petroleum (B.P. 60–80°) to give the desired product having a M.P. of 54–55°.

*Analysis.*—Calculated for $C_{13}H_{12}BrNO_5$ (percent): C, 45.6; H, 3.5; Br, 23.4. Found (percent): C, 45.5; H, 3.6; Br, 23.6.

EXAMPLE VI 6-bromo-4-nitro-2-methylphenoxy-acetic acid, ethyl ester

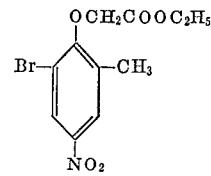

Ethyl chloroacetate (2.5 w.) was added to a solution of 2-bromo-4-nitro-6-methylphenol (4.6 w.) in ethanol (50 v.) containing sodium (0.46 w.), the solution refluxed for 12 hours and then allowed to stand for 60 hours at room temperature. The mixture was evaporated, water (50 v.) added and the mixture extracted with dichloromethane 2× 100 v.). The extract was washed with saturated aqueous sodium carbonate solution (2× 200 v.), water (200 v.) and the dried ($Na_2SO_4$) extract evaporated. The residue was purified by chromatography on silica gel using chloroform as the solvent and the product recrystallized from ether-light petroleum (B.P. 40–60°) to give the desired product, M.P. 69–70°.

*Analysis.*—Calculated for $C_{11}H_{12}NO_5Br$ (percent): C, 41.5; H, 3.8; N, 4.4. Found (percent): C, 41.4; H, 3.5; N, 4.0.

EXAMPLE VII

Following procedures similar to those given in the previous examples, further compounds were prepared, whose physical characteristics and analyses are set out in Table 1.

TABLE 1

| Compound | Physical characteristics M.P. | Analysis Percent | C | H | N | Br |
|---|---|---|---|---|---|---|
| 6-bromo-4-nitro-2-methylphenyl methyl carbonate | 78° | Calculated for $C_9H_8NO_5Br$ | 37.2 | 2.8 | 4.8 | |
| | | Found | 37.6 | 3.0 | 4.7 | |
| 6-bromo-4-nitro-2-methylphenyl N-methyl carbamate | 173–174° | Calculated for $C_9H_9N_2O_4Br$ | 37.4 | 3.1 | 9.7 | |
| | | Found | 37.4 | 3.3 | 10.0 | |
| 6-bromo-4-nitro-2-isopropylphenyl allyl carbonate | (1) | Calculated for $C_{13}H_{14}NO_5Br$ | 45.3 | 4.1 | 4.1 | |
| | | Found | 45.2 | 3.9 | 3.9 | |
| 6-bromo-4-nitro-2-s-butylphenyl methyl carbonate | 104–105° | Calculated for $C_{12}H_{14}NO_5Br$ | 43.4 | 4.2 | 4.2 | 24.1 |
| | | Found | 43.5 | 4.3 | 4.2 | 23.8 |
| 6-iodo-4-nitro-2-s-butylphenyl methyl carbonate | 94–95° | Calculated for $C_{12}H_{12}NO_5I$ | 38.0 | 3.7 | 3.7 | |
| | | Found | 38.4 | 3.6 | 3.6 | |
| 6-bromo-4-nitro-2-cyclohexylphenyl methyl carbonate | 89–90° | Calculated for $C_{14}H_{16}NO_5Br$ | 46.9 | 4.5 | 3.9 | 22.3 |
| | | Found | 47.1 | 4.8 | 3.9 | 22.7 |
| 6-bromo-4-nitro-2-cyclohexylphenyl N-methyl carbamate | 192–193° | Calculated for $C_{14}H_{17}N_2O_4Br$ | 47.1 | 4.8 | 7.8 | |
| | | Found | 47.1 | 4.9 | 7.9 | |

[1] Boiling point 141–142° at 0.05 mm.

EXAMPLE VIII

To demonstrate their herbicidal activity, the compounds of the invention were tested using, as a representative range of plants: oat (O; *Avena sativa*), ryegrass (RG; *Lolium perenne*), sweet corn (SC; *Zea mays*), pea (P; *Pisum sativum*), sugar beet (SB; *Beta vulgaris*), linseed (L; *Linum usitatissimum*), and mustard (M; *Sinapis alba*).

The tests fall into two categories, pre-emergence and post-emergence tests. The pre-emergence tests involve the spraying of a liquid formulation of the compound onto the soil in which the seed of the plant species mentioned above have recently been sown. The post-emergence tests involved two types of tests, viz. soil drench and foliar spray tests. In the soil drench tests the soil was drenched with a liquid formulation containing a compound of the invention after the seeds of the plant species mentioned above had been germinated; in the foliar spray tests seedling plants were sprayed with such a formulation.

The formulations used in the above tests consisted of 50 parts by volume of acetone, 50 parts by volume of water, 0.5 part by weight of an alkylphenol/ethylene oxide condensate available under the tradename Triton X-155, and a compound of the invention in varying amounts.

The seeds of the plant species mentioned above were sown and allowed to germinate in steam-sterilized John Innes Compost.

In the soil spray and foliar spray tests two dosage levels, equivalent to 10 and 1 kilograms of active material per hectare respectively were applied in a volume equivalent to 606 liters per hectare. In the soil drench test one dosage level, equivalent to 20 kilograms active material per hectare, was applied at a volume equivalent to 2200 liters per hectare.

Control tests were also carried out in which sown soil, soil bearing seedling plants, and plants were sprayed or drenched with the same volumes of compositions from which the compound of the invention had been omitted.

The herbicidal effects of the compounds concerned were assessed visually seven days after spraying the foliage and drenching the soil (post-emergence test) and eleven days after spraying the soil (pre-emergence test), and were recorded on a 0-9 scale (0=no effect and 9=very strong herbicidal effect). A rating 2 approximately corresponds to a reduction in fresh weight of stem and leaf of the treated plants of 25%, a rating 5 approximately corresponds to a reduction in weight of 55%, a rating 9 to a reduction in weight of 95%, etc. The results of these tests are shown in Table 2.

TABLE 2

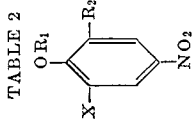

| Compound | | | Dosage, kg./ha. | Pre-emergence (seeds), soil spray | | | | | | | Growth inhibition Foliar spray | | | | | | | Post-emergence (plants) Dosage, kg./ha. | Soil drench | | | | | | |
|---|---|---|---|---|---|---|---|---|---|---|---|---|---|---|---|---|---|---|---|---|---|---|---|---|---|
| $R^1$ | $R^2$ | X | | SC | O | RG | P | L | M | SB | SC | O | RG | P | L | M | SB | | SC | O | RG | P | L | M | SB |
| COOCH$_3$ | CH$_3$ | Br | 10 / 1 | 2 / 2 | 2 / 0 | 0 / — | 6 / 0 | 4 / 0 | 9 / 5 | 6 / 0 | 4 / 1 | 9 / 7 | 9 / 4 | 9 / 7 | 9 / 7 | 9 / 9 | 9 / 9 | 20 | 2 | 6 | 0 | 2 | 4 | 7 | 8 |
| COOCH$_3$ | (CH$_3$)$_2$CH | Br | 10 / 1 | 2 / 2 | 0 / 0 | — / — | 0 / 0 | 0 / 0 | 9 / 0 | 9 / 3 | 5 / 3 | 7 / 1 | 9 / 3 | 7 / 1 | 7 / 1 | 9 / 9 | 9 / 9 | 20 | 0 | 0 | 2 | 0 | 0 | 0 | 8 |
| COOCH$_3$ | (CH$_3$)(C$_2$H$_5$)CH | Br | 10 / 1 | 0 / 0 | 0 / 0 | 0 / 0 | 0 / 0 | 0 / 0 | 8 / 0 | 3 / 0 | 5 / 0 | 7 / 1 | 7 / 0 | 7 / 1 | 7 / 0 | 9 / 9 | 9 / 9 | 20 | 0 | 0 | 2 | 0 | 0 | 0 | 0 |
| CONHCH$_3$ | CH$_3$ | Br | 10 / 1 | 0 / — | 1 / — | 3 / — | 0 / — | 2 / — | 3 / — | 6 / — | 3 / 1 | 7 / 3 | 8 / 3 | 3 / 1 | 3 / 1 | 9 / 7 | 9 / 7 | 20 | 1 | 0 | 0 | 0 | 5 | 4 | 5 |
| CONHCH$_3$ | (CH$_3$)$_2$CH | Br | 10 / 1 | 0 / 0 | 2 / 0 | 4 / 0 | 0 / 0 | 9 / 2 | 9 / 0 | 9 / 6 | 3 / 0 | 2 / 4 | 3 / 0 | 3 / 0 | 3 / 0 | 9 / 8 | 9 / 8 | 20 | 2 | 0 | 0 | 0 | 3 | 6 | 5 |
| COCH$_3$ | CH$_3$ | Br | 10 / 1 | 0 / 0 | 0 / 0 | 3 / 0 | 2 / 0 | 5 / 0 | 9 / 0 | 5 / 0 | 0 / 0 | 4 / 0 | 0 / 0 | 2 / 0 | 2 / 0 | 9 / 8 | 9 / 3 | 20 | 0 | 0 | 0 | 0 | 0 | 0 | 0 |
| COOCH$_2$CH=CH$_2$ | (CH$_3$)$_2$CH | Br | 10 / 1 | 0 / — | 1 / — | 1 / — | 0 / — | 0 / — | 9 / 3 | 6 / 0 | 1 / 1 | 6 / 0 | 3 / 0 | 5 / — | 5 / — | 9 / 9 | 9 / 9 | — | — | — | — | — | — | — | — |
| COOCH$_3$ | Cyclohexyl | Br | 10 / 1 | 0 / 0 | 0 / 0 | 2 / 0 | 0 / 0 | 0 / 0 | 4 / 0 | 5 / 0 | 1 / 0 | 8 / 1 | 0 / 0 | 2 / 1 | 2 / 1 | 9 / 9 | 9 / 9 | 20 | 0 | 1 | 0 | 0 | 0 | 8 | 2 |
| COOCH$_3$ | (CH$_3$)$_2$CH | Cl | 10 / 1 | 0 / 0 | 0 / 0 | 0 / 0 | 0 / 0 | 0 / 0 | 8 / 0 | 9 / 0 | 0 / 3 | 4 / 0 | 6 / 0 | 5 / — | 5 / — | 9 / 9 | 9 / 9 | 20 | 0 | 2 | 3 | 0 | 0 | 4 | 7 |
| COOCH$_3$ | (CH$_3$)$_2$CH | I | 10 / 1 | 0 / 0 | 0 / 0 | 0 / 0 | 0 / 0 | 0 / 0 | 8 / 0 | 7 / 5 | 4 / 1 | 7 / 0 | 6 / 0 | 5 / 1 | 5 / 1 | 9 / 9 | 9 / 9 | 20 | 0 | 2 | 5 | 0 | 0 | 8 | 9 |
| COOCH$_2$C≡CH | (CH$_3$)$_2$CH | Br | 10 / 1 | 0 / — | 0 / — | 0 / — | 0 / — | 0 / — | 8 / 1 | 6 / 0 | 1 / 0 | 7 / 0 | 9 / 0 | 3 / 0 | 3 / 0 | 9 / 9 | 9 / 9 | 20 | 0 | 2 | 1 | 4 | 0 | 4 | 8 |
| COOCH$_3$ | (CH$_3$)(C$_2$H$_5$)CH | I | 10 / 1 | 0 / 0 | 3 / 0 | 3 / 0 | 2 / 0 | 0 / 0 | 9 / 0 | 9 / 0 | 2 / 0 | 9 / 0 | 9 / 3 | 8 / 0 | 8 / 0 | 9 / 9 | 9 / 9 | 20 | 0 | 0 | 0 | 7 | 8 | 4 | 4 |
| H | CH$_3$ | Br | 10 / 1 | 0 / 0 | 2 / 0 | 5 / 0 | 0 / 0 | 2 / 0 | 0 / 0 | 9 / 0 | 3 / 0 | 9 / 0 | 9 / 5 | 3 / 0 | 3 / 0 | 9 / 9 | 9 / 9 | 20 | 5 | 6 | 5 | 7 | 8 | 9 | 8 |
| H | (CH$_3$)$_2$CH | Br | 10 / 1 | 0 / 0 | 0 / 0 | 4 / 0 | 0 / 0 | 0 / 0 | 9 / 0 | 9 / 0 | 2 / 0 | 9 / 0 | 5 / 0 | 6 / 0 | 6 / 0 | 9 / 9 | 9 / 8 | 20 | 3 | 6 | 7 | 7 | 9 | 7 | 8 |
| H | (CH$_3$)$_2$CH | I | 10 / 1 | 0 / 0 | 0 / 0 | 6 / 0 | 0 / 0 | 4 / 2 | 8 / 0 | 8 / 0 | 3 / 0 | 8 / 0 | 9 / 0 | 6 / 0 | 6 / 0 | 9 / 9 | 9 / 8 | — | — | — | — | — | — | — | — |
| CH$_2$COOC$_2$H$_5$ | CH$_3$ | Br | 10 / 1 | 0 / 0 | 0 / 0 | 0 / 0 | 0 / 0 | 0 / 0 | 0 / 0 | 0 / 0 | 2 / 3 | 0 / 0 | 0 / 0 | 2 / 0 | 2 / 0 | 9 / 3 | 8 / 2 | 20 | — | — | — | — | — | — | — |

We claim as our invention:
1. A compound of the formula:

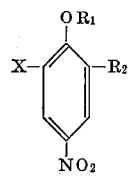

wherein $R_1$ is a radical containing from 2 to 6 carbon atoms selected from the group consisting of alkoxycarbonyl, alkenyloxycarbonyl and alkynyloxycarbonyl; $R_2$ is a member selected from the group consisting of $C_1$ to $C_6$ alkyl and $C_3$ to $C_6$ cycloalkyl; and X is a member selected from the group consisting of chlorine, bromine and iodine.

2. A compound as claimed in claim 1 wherein $R_1$ is a member selected from the group consisting of methoxycarbonyl, allyloxycarbonyl, propargyloxycarbonyl, N-methylcarbamoyl and ethoxycarbonylmethyl group; and $R_2$ is a member selected from the group consisting of methyl, propyl, butyl and cyclohexyl.

3. A compound as claimed in claim 2 wherein $R_1$ is methoxycarbonyl.

4. A compound as claimed in claim 3 wherein X is a bromine atom.

5. A compound as claimed in claim 4 wherein $R_2$ is isopropyl.

6. A compound as claimed in claim 4 wherein $R_2$ is secondary butyl.

7. A compound as claimed in claim 4 wherein $R_2$ is methyl.

8. A compound as claimed in claim 2 wherein $R_4$ is methoxycarbonyl, $R_2$ is isopropyl and X is iodine.

References Cited

FOREIGN PATENTS 941,709  11/1963  Great Britain.

LEWIS GOTTS, Primary Examiner

D. G. RIVERS, Assistant Examiner

U.S. Cl. X.R.

260—471 R, 479 C, 622 R; 71—106, 108, 109